United States Patent
Kruszynski et al.

(10) Patent No.: US 7,575,400 B2
(45) Date of Patent: Aug. 18, 2009

(54) DRILLING TOOL WITH ALTERNATING CUTTING PLATES AND ALTERNATING CUTTING PLATES FOR SAID DRILLING TOOL

(75) Inventors: Jacek Kruszynski, Stuttgart (DE); Helmut Morlok, Loechgau (DE); Henry Schuett, Sachsenheim (DE); Peter Leuze, Walheim (DE)

(73) Assignee: Komet Group Holding GmbH, Besigheim (DE)

( * ) Notice: Subject to any disclaimer, the term of this patent is extended or adjusted under 35 U.S.C. 154(b) by 448 days.

(21) Appl. No.: 10/527,292

(22) PCT Filed: Aug. 26, 2003

(86) PCT No.: PCT/EP03/09426

§ 371 (c)(1),
(2), (4) Date: Dec. 12, 2005

(87) PCT Pub. No.: WO2004/024381

PCT Pub. Date: Mar. 25, 2004

(65) Prior Publication Data

US 2006/0110227 A1     May 25, 2006

(30) Foreign Application Priority Data

Sep. 9, 2002 (DE) ................................ 102 41 841
May 13, 2003 (DE) ................................ 103 21 635

(51) Int. Cl.
*B23B 51/02* (2006.01)
(52) U.S. Cl. ......................... 408/57; 408/230; 408/713

(58) Field of Classification Search .................... 408/57, 408/59, 223–225, 227, 229, 230, 233, 713; *B23B 51/00, B23B 51/02*
See application file for complete search history.

(56) References Cited

U.S. PATENT DOCUMENTS 2,966,081 A * 12/1960 Kallio .......................... 408/230

(Continued)

FOREIGN PATENT DOCUMENTS

DE      2655452 A1 * 6/1978

(Continued)

*Primary Examiner*—Daniel W Howell
(74) *Attorney, Agent, or Firm*—Flynn, Thiel, Boutell & Tanis, P.C.

(57) ABSTRACT

The invention relates to a dual-cutting drilling tool. The drilling tool comprises a base body (14) which is rotatable about a drill axis (36) and in which two plate seats (16) are arranged on the front face thereof for receiving identically configured alternating cutting plates (16). The alternative cutting plates are respectively provided on a main cutting edge (28) thereof with an adjacent first face (30), forming a cutting wedge, and a free surface (24). The main cutting edges (28) of the alternating cutting plates (20) complement each other in the region of a central, offset cutting part (28'), forming a cross-cutting edge which is interrupted by a center hole (60). The aim of the Invention is to reduce the risk of breakage in the center area of the alternating cutting plates and to provide better guidance for the tool. According to the invention, slanting guiding inclinations (56) are provided on the free surface of the alternating cutting places (20), extending from an apex line (54) to the center corner (46) of the plates. The free surfaces (24) are positively inclined in a radially outer region in the direction of advancement and are negatively inclined in the region of the guiding inclinations (56) thereof.

42 Claims, 14 Drawing Sheets

U.S. PATENT DOCUMENTS

| | | | | |
|---|---|---|---|---|
| 3,791,001 | A * | 2/1974 | Bennett | 407/113 |
| 4,231,692 | A * | 11/1980 | Brabetz et al. | 408/230 |
| 4,659,264 | A * | 4/1987 | Friedline | 408/204 |
| 4,768,901 | A | 9/1988 | Reinauer et al. | |
| 4,961,672 | A * | 10/1990 | Lindberg | 408/144 |
| 5,092,718 | A * | 3/1992 | Shallenberger | 408/188 |
| 5,314,272 | A * | 5/1994 | Kubota | 408/224 |
| 5,695,303 | A | 12/1997 | Boianjiu et al. | |
| 5,800,100 | A | 9/1998 | Krenzer | |
| 5,816,754 | A * | 10/1998 | Shallenberger | 408/227 |
| 5,829,927 | A * | 11/1998 | Nakamura et al. | 408/230 |
| 6,238,151 | B1 * | 5/2001 | Takagi | 408/230 |
| 6,874,979 | B2 * | 4/2005 | Takiguchi et al. | 408/227 |
| 2004/0028491 | A1 | 2/2004 | Fritsch et al. | |

FOREIGN PATENT DOCUMENTS

| | | | |
|---|---|---|---|
| DE | 100 30 297 A1 | | 1/2002 |
| EP | 0 240 759 | | 4/1986 |
| EP | 0 491 670 A2 | | 6/1992 |
| GB | 2 016 316 | | 9/1979 |
| JP | 59161208 A | * | 9/1984 |
| JP | 11291102 A | * | 10/1999 |
| JP | 2000288815 A | * | 10/2000 |
| WO | WO01/85375 | | 11/2001 |

* cited by examiner

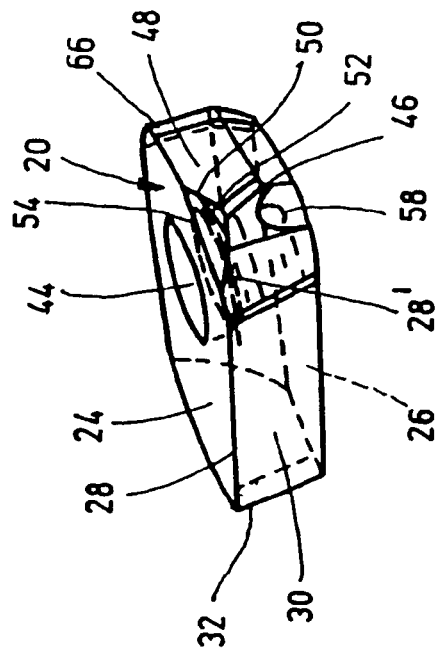
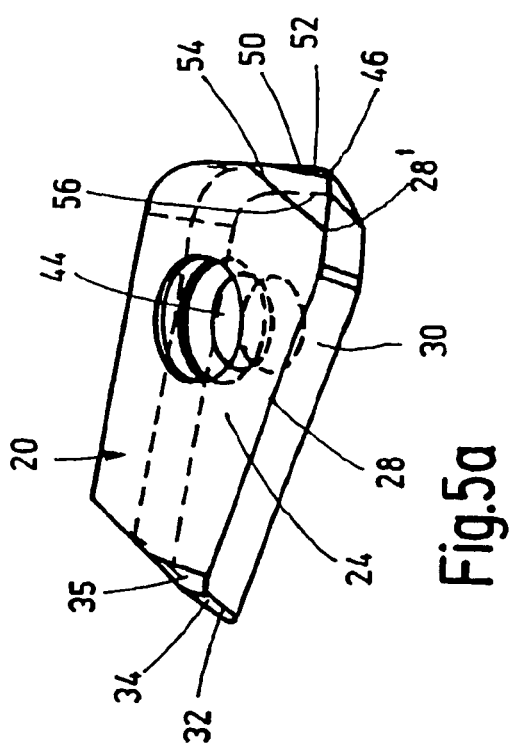
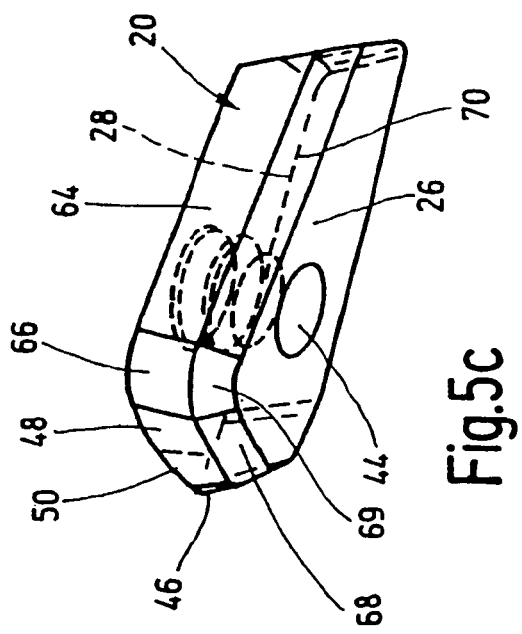

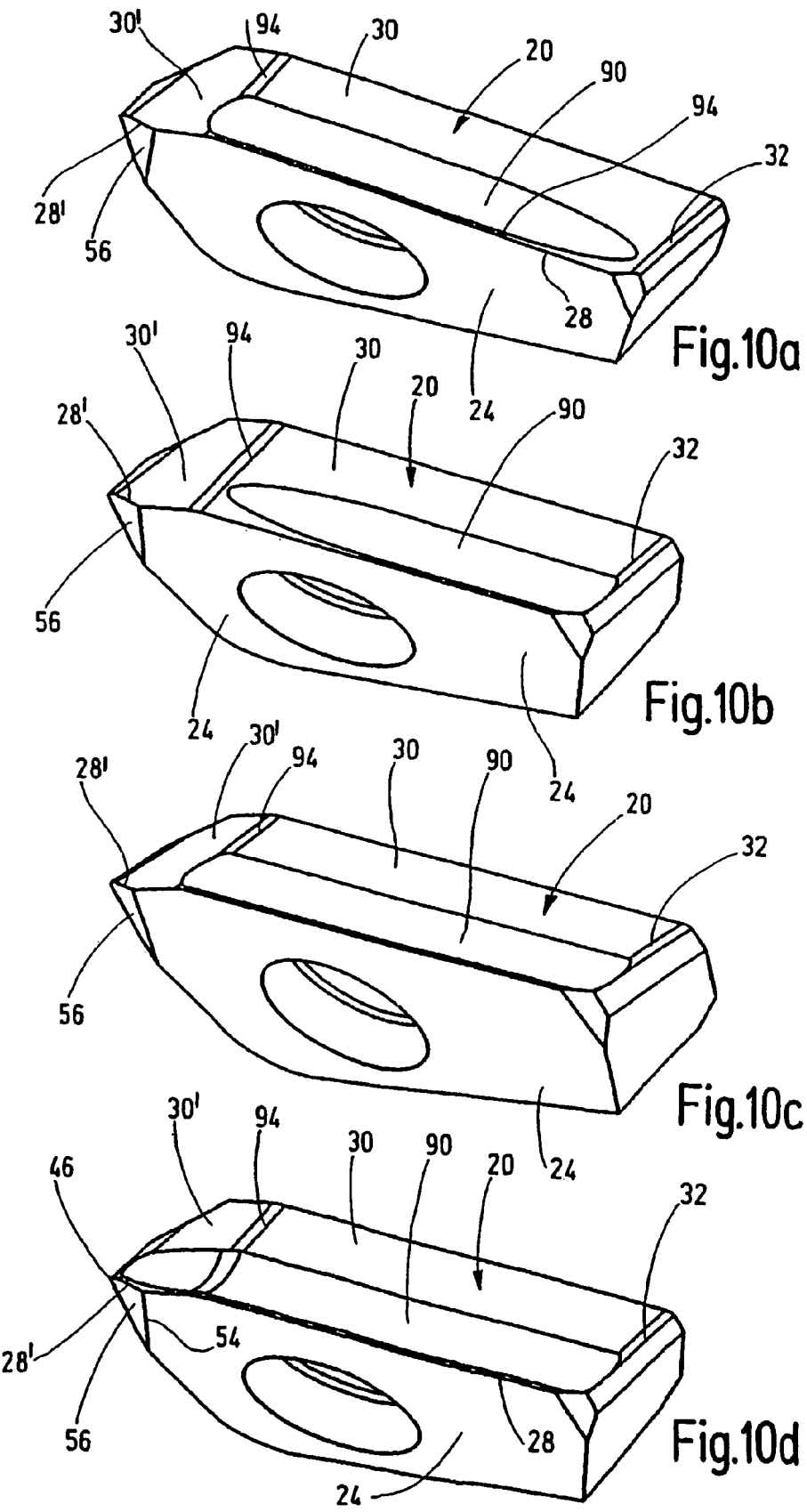

DRILLING TOOL WITH ALTERNATING CUTTING PLATES AND ALTERNATING CUTTING PLATES FOR SAID DRILLING TOOL

The invention relates to a drilling tool having a basic body rotatable about a drill axis, having two insert seats arranged in the point region of the basic body, and having interchangeable inserts which are interchangeably inserted into the insert seats, face one another at a central insert corner over the drill axis while leaving a center gap clear, and have a main cutting edge, extending from a radially outer guide bevel up to the central insert corner, and a respective rake face and flank which meet in the region of the main cutting edge while forming a cutting wedge, the main cutting edges of the interchangeable inserts complementing one another in the region of a central, preferably angled cutting-edge part to form a chisel edge interrupted by the center gap. The invention also relates to an interchangeable insert for use in a drilling tool of said type.

Drilling tools of this type are used as double-cutting solid drills which are constructed in a similar manner to a twist drill but with interchangeable inserts. In the region of their main cutting edges, the interchangeable inserts screwed into the drill point at the end face have a point angle which ensures that the drill is centered in the drill hole (DE-A 100 30 297). Since the inserts do not cut over the drill axis, but are at a distance from one another in this region while leaving the center gap clear, a small slug or plug, which is not cut, is left there during the drilling operation. In this case, the distance apart in the region of the center gap is set in such a way that the resulting plug is small enough for it to be crumbled during the drilling operation. In order to be able to absorb in a nondestructive manner the pressure forces which occur during the drilling operation, the central cutting-edge part is rounded off or beveled in the profile of the cutting edge. However, it has been found during the operation of such drilling tools that the protective bevel formed in this way is not sufficient in order to rule out the risk of fracture of the interchangeable insert at this location. In addition, the guidance of the known drill during the drilling operation leaves a great deal to be desired.

Based thereon, the object of the invention is to improve the known drilling tool and the interchangeable inserts of the type specified at the beginning to the effect that the risk of fracture in the central region of the interchangeable inserts is reduced and better guidance of the tool is ensured.

To achieve this object, the feature combinations specified in claims 1 and 41 are proposed. Advantageous configurations and developments of the invention follow from the dependent claims.

The solution according to the invention essentially consists in the fact that the interchangeable inserts, at their flank, have an inclined deflecting chamfer running from an apex line, starting from the region of their central cutting-edge part, up to the central insert corner, and that the flanks are inclined positively in the feed direction in the radially outer region in such a way as to complement one another in an arrow-like manner and negatively in the feed direction toward the center gap in the region of their deflecting chamfers in such a way as to complement one another in a funnel-like manner. The center chamfers on the inserts ensure that the drill point is given the form of an inverted W in the feed direction, with the effect that the jamming of chips in the region of the center chamfers is reduced and the pressure forces occurring during the chip separation are distributed over a larger area in the center region. As a result, the risk of fracture in the central insert region is effectively avoided.

The following comments relate mainly to the case of the vertical interchangeable inserts, the through-opening of which passes through the flank and the locating surface remote from the flank. The principle of the invention can in principle also be applied to drilling tools with horizontal interchangeable inserts, in which it is not the flank but the rake face and the locating surface remote from the rake face through which the through-opening for a fastening element passes. In this case, the insert seats in the point region of the basic body are arranged horizontally.

The center chamfer performs a guidance function for the residual chip produced in the center region in the direction of the center gap. In addition, a relieved portion in the region of the central insert corner and a concave contour, axially set back relative to the insert seats, in the basic body result in improved chip disposal. Furthermore, the concave contour in the basic body ensures that the notch effect of the expanding forces acting in the region of the drill center web during the drilling operation is reduced.

The rake-face sections belonging to the central and the radially outer cutting-edge part of the main cutting edge enclose a chisel-edge angle of less than 70°, preferably 20° to 40°, with one another in the transition region. In the case of exactly symmetrical arrangement of the interchangeable inserts on the basic body a symmetrical operating mode with compensated radial forces results. As a result, the drill is indeterminate in its position with regard to the two inserts during the drilling operation. Slight differences in radial force during the cutting operation are sufficient in order to deflect the drill in the one or the other direction. This indeterminacy leads to tolerances which can be attributed to random deflection in the one or the other radial direction. The straightness of the drill hole is therefore not always ensured in such a configuration.

More accurate drill holes can be achieved if a machining dominance is produced on one of the two interchangeable inserts by introducing a certain asymmetry in the insert arrangement. This can be achieved, for example, by those sections of the main cutting edges of the two interchangeable inserts which correspond to one another enclosing an angle with one another which is not equal to 180°. It has been found that a slight deviation, for example between 0° and 4°, leads to a sufficient preferred direction without excessive unevenness in the wear occurring in the process. It is entirely sufficient if the angular offset is selected to be slightly greater than the tolerances influencing the displacement effect. In this case, the insert leading with its cutting edge assumes the dominant guidance function, while the trailing insert is made to follow up. The insert dominance can also be influenced by the interchangeable inserts being offset axially. The axially leading insert produces a somewhat thicker chip. The optimum axial offset is accordingly in the order of magnitude of $1/100$ mm, preferably 0.005 mm to 0.05 mm. If the dominance between the inserts is correctly set, clearly defined radial guidance on the wall of the drill hole is obtained via the radially outer guide bevel of the non-dominant insert.

A further preferred configuration of the invention provides for the radially outer flank part containing the through-opening and the central deflecting chamfer to enclose an apex angle of less than 170°, preferably between 120° and 160°, with one another in the region of the apex line.

According to a further advantageous configuration of the invention, the apex line starts from a position within the central cutting-edge part and runs to an opposite insert edge, the central cutting-edge part and the opposite insert edge meeting in the central insert corner. It follows from this that the central deflecting surface has a triangular outline defined by the apex line, a section of the central cutting-edge part and a section of the adjacent insert edge. In this case, the height of the central deflecting surface of triangular outline, this height being measured between the apex line and the insert corner, is advantageously a multiple of the width of the center gap, preferably 5 to 20 times the width of the center gap, the width of the center gap depending on the toughness of the workpiece material to be worked and expediently being less than 0.3 mm.

In order to improve the cooling in the region of the interchangeable inserts and the chip disposal during the drilling operation, it is proposed according to an alternative or preferred configuration of the invention that the interchangeable inserts, with their bearing surfaces remote from the rake face and with their locating surface, bear against complementary seating surfaces of the insert seat, that the bearing surfaces, via a respective locating bevel forming a channel-like clearance space with the seating surfaces of the insert seat, merge into the locating surface, and that a respective cooling channel which is arranged in the basic body and to which a cooling lubricant can be admitted open into each insert seat in the region of the channel-like clearance space. In this case, the channel-like clearance space is expediently open both inward to the center gap and outward to the radially outer guide bevel. The cooling lubricant directed through the cooling channels contributes to the cooling and lubrication at the outside guide bevel, whereas, inward toward the center gap, it provides for the removal of the crumbled chips arising there into the chip flutes.

The bearing surfaces, remote from the rake face, of the interchangeable inserts and their locating bevels advantageously merge into one another via a rounded insert corner, the cooling channel advantageously opening into the insert seat in the vicinity of the rounded-off insert corner.

So that the radial forces occurring during the drilling operation do not have to be absorbed solely by the fastening screws, it is proposed according to a further advantageous configuration of the invention that the insert seats and the interchangeable inserts have indentations, engaging one inside the other in a complementary manner, for producing radial interlocking.

For further improvement of the cutting properties of the drilling tool, it is proposed according to a preferred configuration of the invention that the interchangeable insert, in the region of the rake face, has a chip-forming depression adjoining at least part of the main cutting edge. The chip-forming hollow can extend at least partly into the region of the central cutting part, if need be even over the apex line into the region of the rake face, adjoining the deflecting chamfer, into the vicinity of the central insert corner. In addition, the chip-forming depression can extend right into the vicinity of the secondary cutting edge and possibly even pass through the latter. The chip-forming depression expediently has a concave, preferably partly cylindrical base surface. The main cutting edge and the chip-forming depression are advantageously separated from one another by a bevel running preferably parallel to the main cutting edge. The chip-forming depression described is intended in particular to ensure that the chip produced during the drilling operation is formed in such a way that it is drawn away from the center.

A further improvement in this respect can be achieved by the main cutting edge being interrupted by chip breaker notches arranged at a distance from one another. The chip breaker notches are expediently arranged outside the central cutting-edge part. In principle, however, chip breaker notches may also be arranged in the region of the central cutting-edge part.

According to an advantageous configuration of the invention, the secondary cutting edge is oriented so as to run parallel to the drill axis or so as to diverge from the feed direction by an angle of up to 30°.

The invention is explained in more detail below with reference to an exemplary embodiment shown schematically in the drawing, in which:

FIG. 3b shows an enlarged detail from FIG. 3a;

Figure 4A:
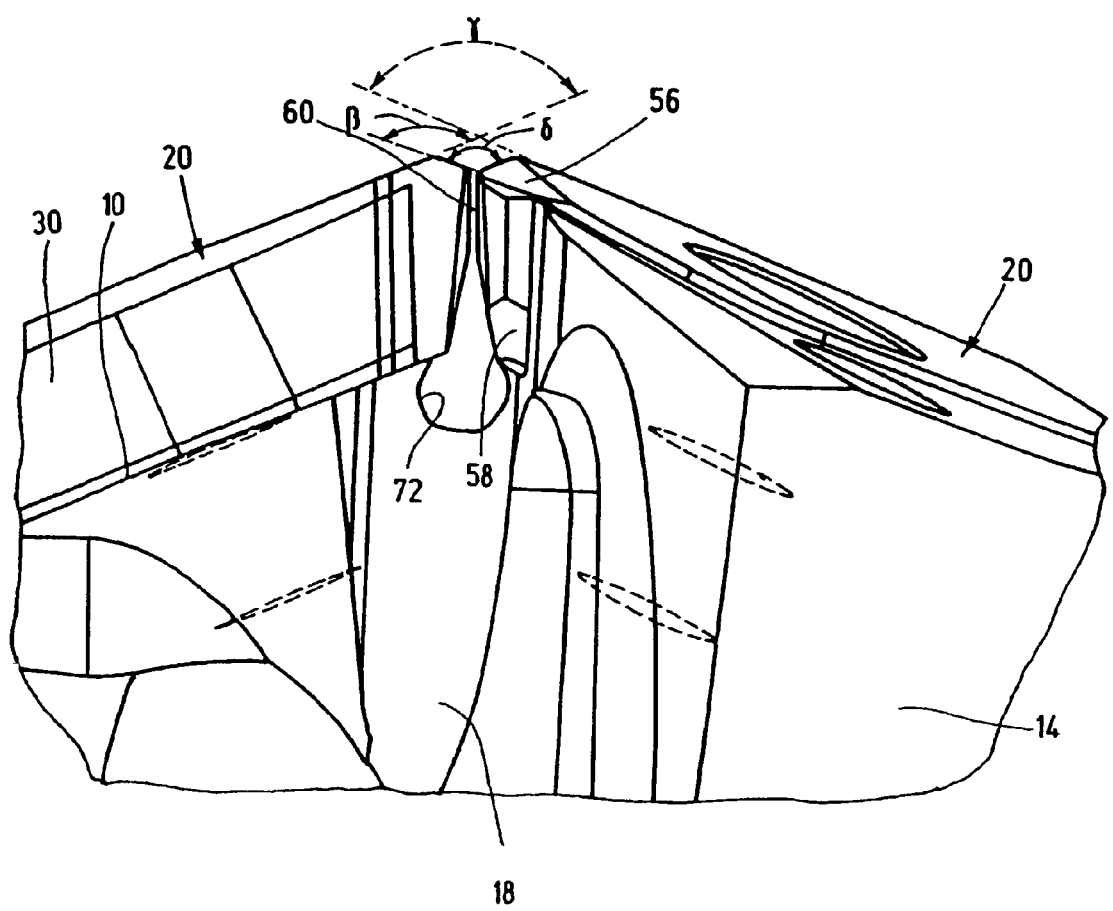
Figure 6:
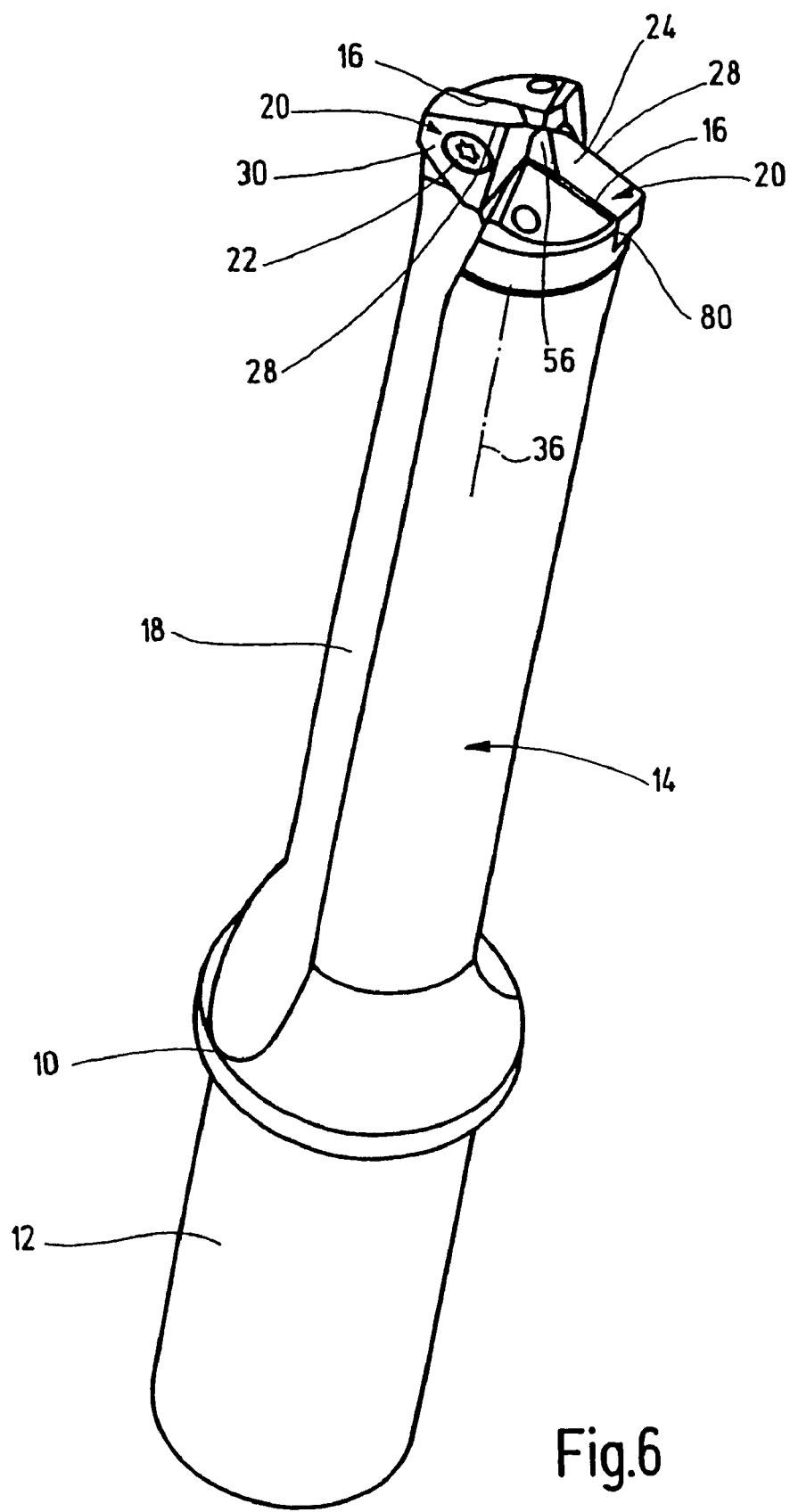
Figure 7A:
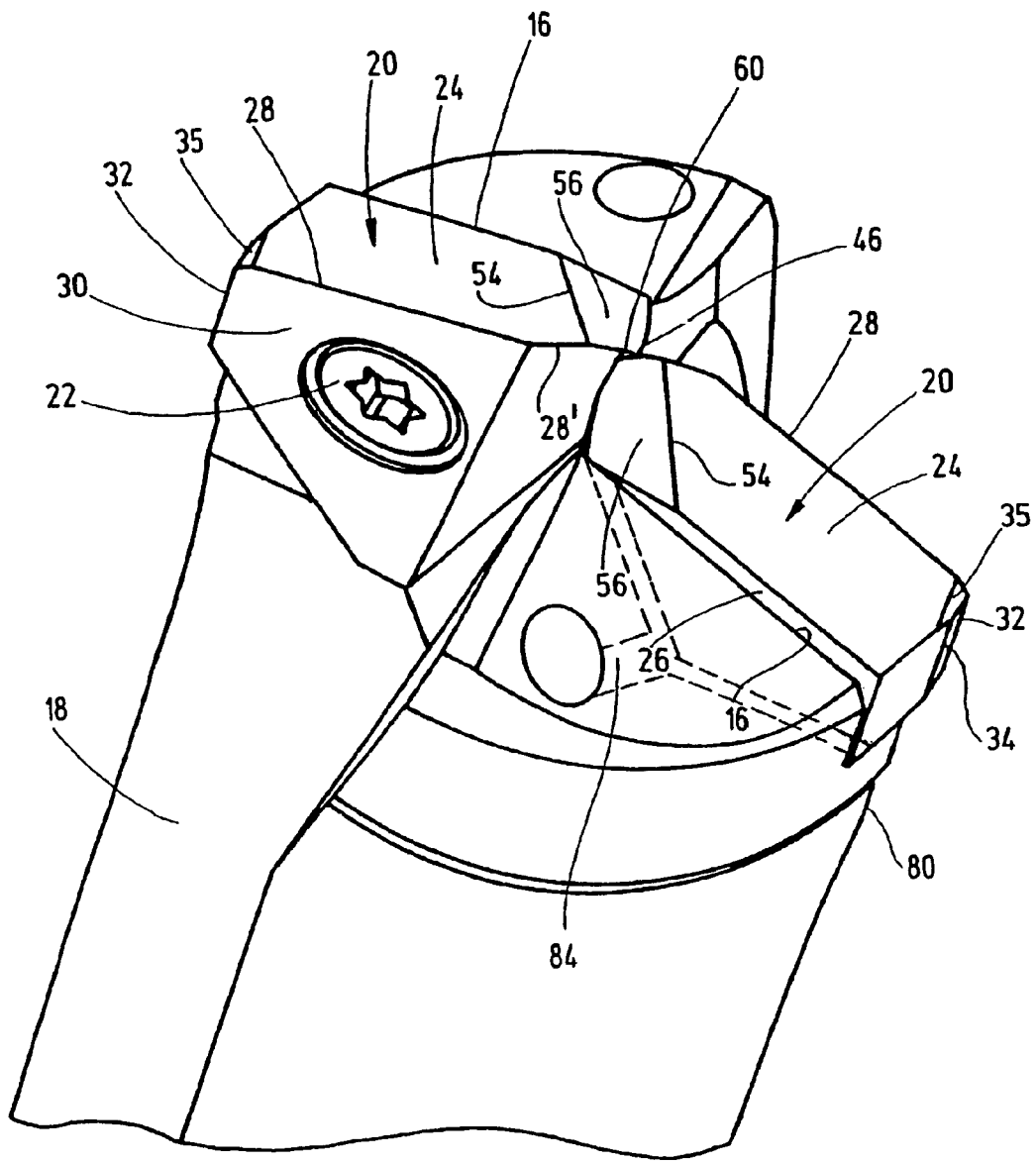
Figure 7B:
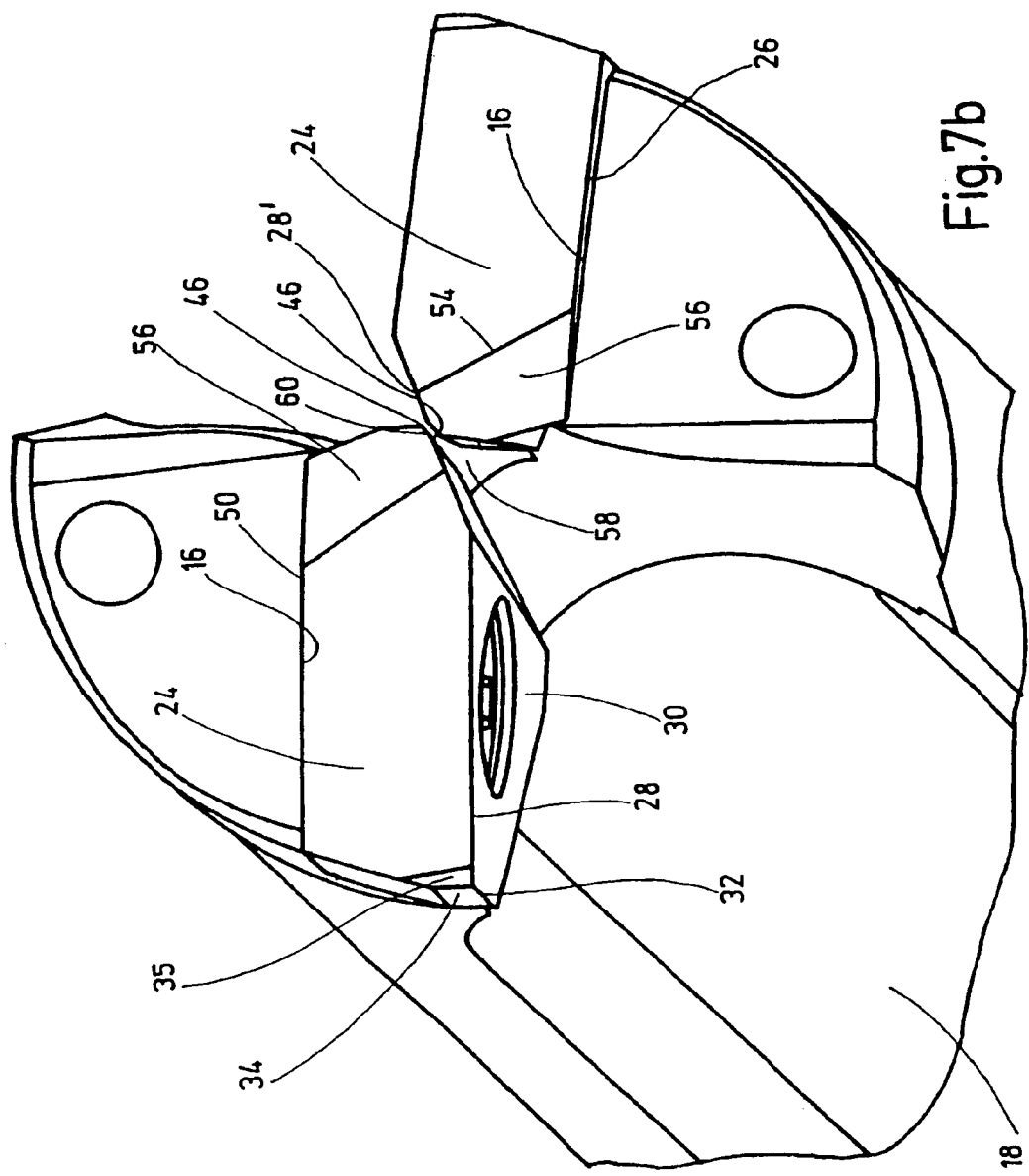
Figure 8:
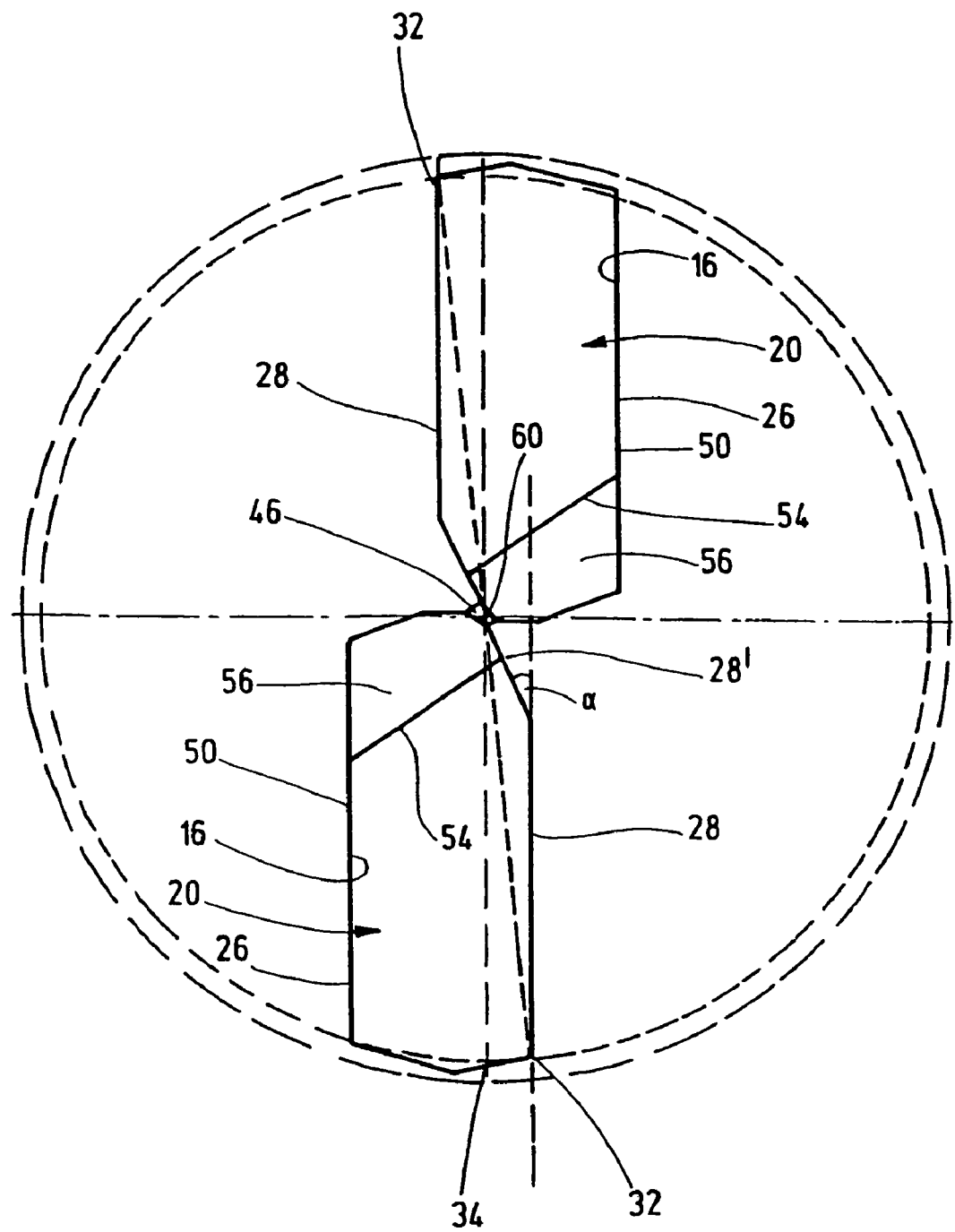
Figure 9:
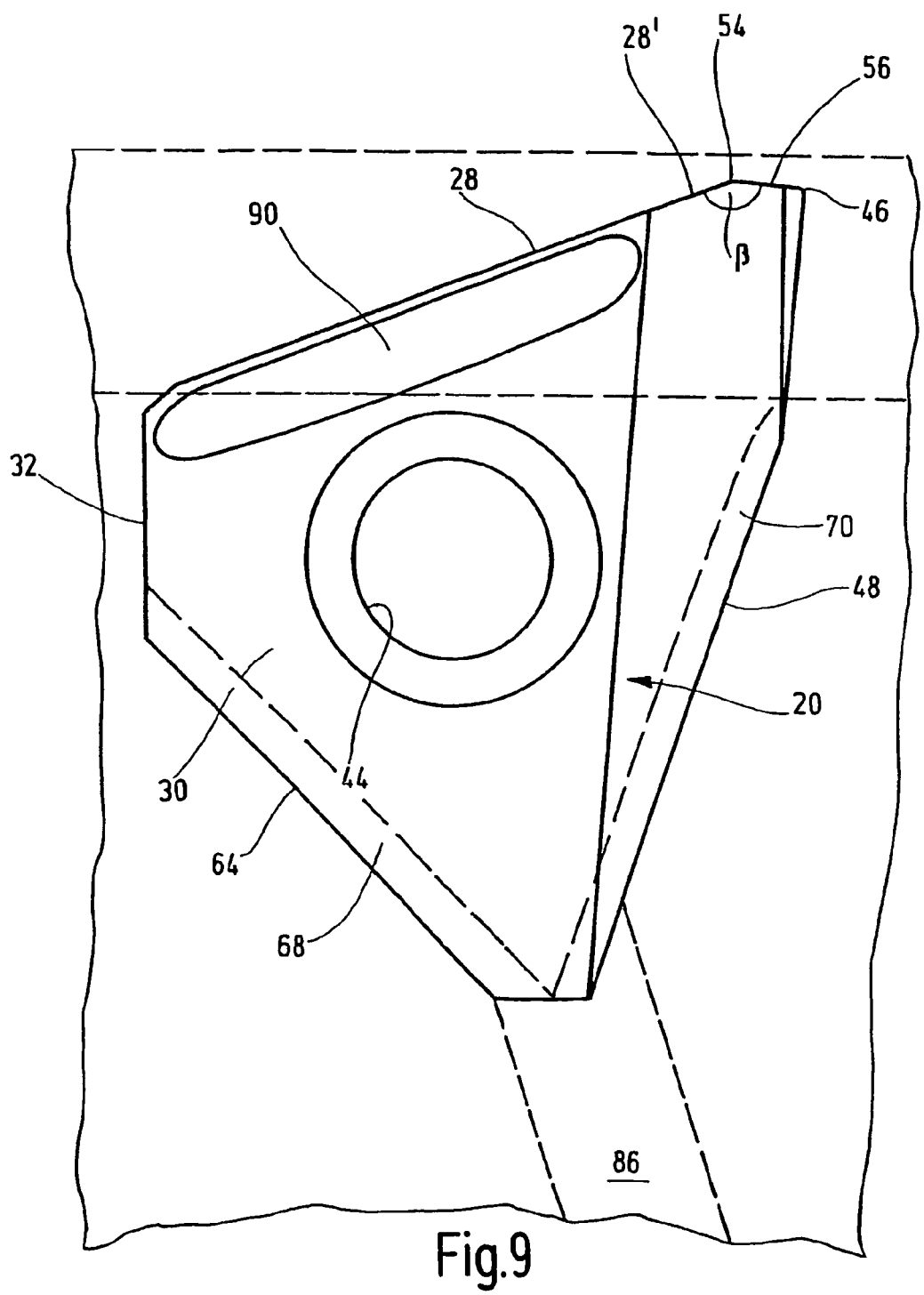
Figure 11A:
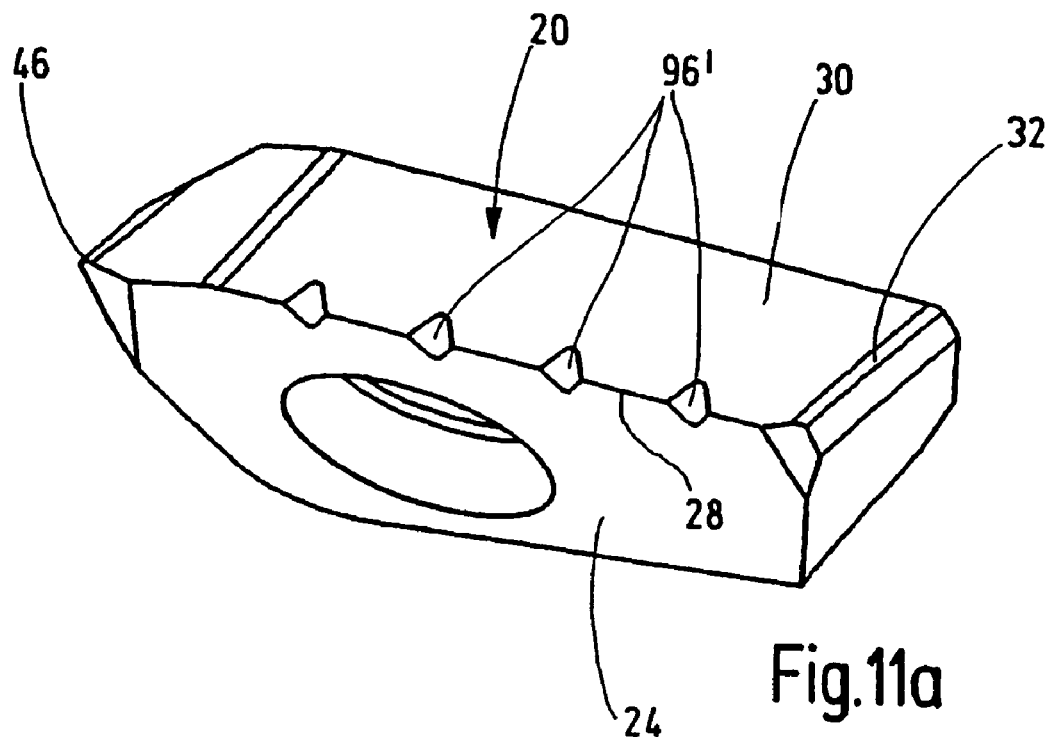
Figure 11B:
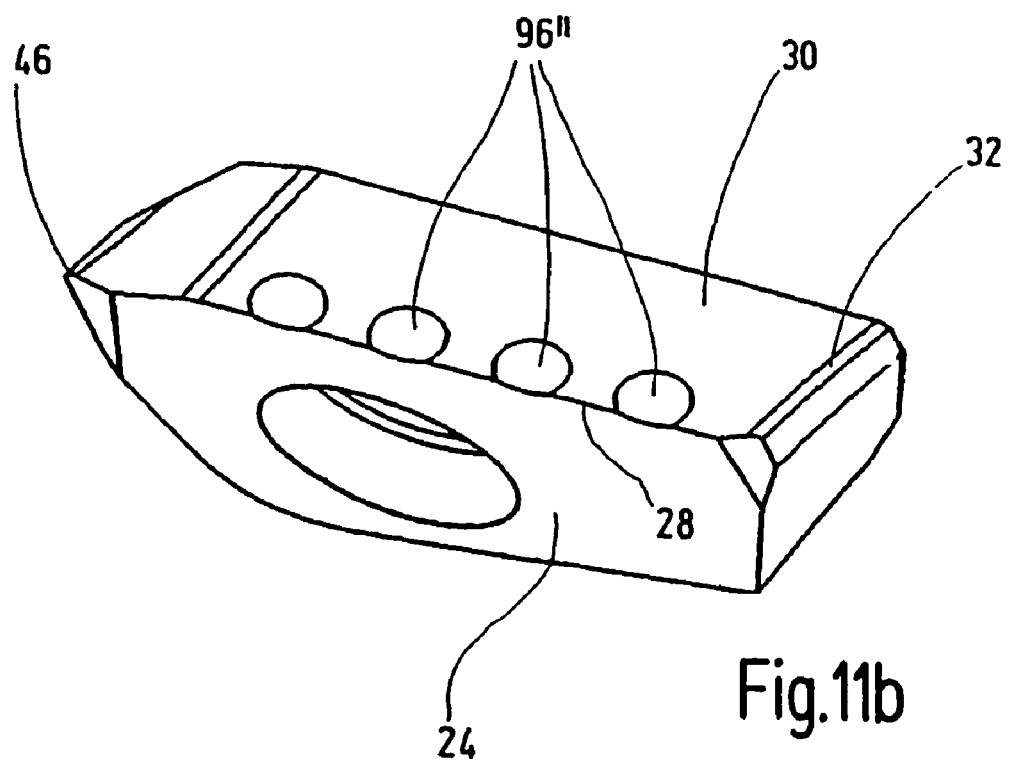

FIGS. 4a and b show two enlarged details of the drilling tool in a respective side view;

FIGS. 5a to c show the interchangeable insert for the drilling tool in three different diagrammatic illustrations;

FIG. 6 shows a diagrammatic illustration of a drilling tool with horizontal interchangeable inserts;

FIGS. 7a and b show two enlarged details of the point region of the drilling tool according to FIG. 6;

FIG. 8 shows a front end view of the drilling tool according to FIG. 6;

FIG. 9 shows a side view of the interchangeable insert for the drilling tool according to FIG. 6;

FIGS. 10a to d each show an interchangeable insert for the tool, having chip-forming depressions of different design in the region of the rake faces, in diagrammatic illustrations;

FIGS. 11a and b show two exemplary embodiments of an interchangeable insert for the drilling tool, having chip breaker notches of different design in the region of the main cutting edge, in each case in a diagrammatic illustration.

The drilling tools shown in the drawings are designed as double-cutting solid drills. The drilling tools are intended for use in machine tools and for this purpose have a coupling shank 12 for connection to a machine spindle (not shown), this coupling shank 12 being defined by a coupling flange 10 for flat-face contact. In addition, an elongated basic body 14 is connected to the coupling flange 10 and is provided at the end face with two insert seats 16, from which chip flutes 18 extend over the length of the basic body 14. Two interchangeable inserts 20 of identical design are arranged in the insert seats 16 and are fastened to the basic body 14 by fastening screws 22.

The vertically arranged inserts 20 according to FIGS. 1 to 5 have a flank 24 and a locating surface 26 remote from the latter, the flank 24 and the locating surface 26 being oriented in a plane-parallel manner relative to one another. On the side of the chip flute, the flank 24 is defined by the main cutting edge 28 and the adjoining rake face 30 leading into the chip flute 18. Radially on the outside, a secondary cutting edge 32, designed at the same time as a guide edge, and a guide bevel 34 adjoin the main cutting edge 28 and the rake face 30. Following a cutting bevel 35, the secondary cutting edge 32 and the guide bevel 34 extend over the insert thickness parallel to the drill axis 36. The guide bevels 34 of the two inserts 20 help to guide the drilling tool in the drill hole, while the point angle, which can be seen in particular in FIG. 4, between the main cutting edges 28 of the two inserts 20 ensures centering of the drill in the drill hole. The fastening opening 44 for the fastening screws 22 to pass through passes through the interchangeable inserts transversely between flank 24 and locating surface 26. As can be seen in particular from FIG. 3b, the main cutting edges 28 of the interchangeable inserts 20 have a central cutting-edge part 28' which forms a chisel-edge angle α of about 30° and extends up to the insert corner 46, starting from which is a center bevel 52 which merges into a bearing edge 50 defining the bearing surface 48. The flank 24 has a deflecting chamfer 56 which runs from an apex line 54, arranged in the region between through-opening 44 and inner insert corner 46, up to the inner insert corner 46 and is inclined in the direction of locating surface 26. The apex angle β between the radially outer flank part 24 containing the through-opening 44 and the deflecting chamfer 56 is about 140° in the exemplary embodiment shown. In this case, the apex line 54 starts from a position within the central cutting-edge part 28' and extends up to the opposite insert edge 50. As can be seen from FIG. 3b, the central deflecting chamfer has a triangular outline defined by the apex line 54, a section of the central cutting-edge part 28' and a section of the insert edge 50. Furthermore, a relieved portion 58 open at the margin toward the basic body 14 is arranged in the region of the central insert corner on the side of the locating surface 26.

Figure 1:
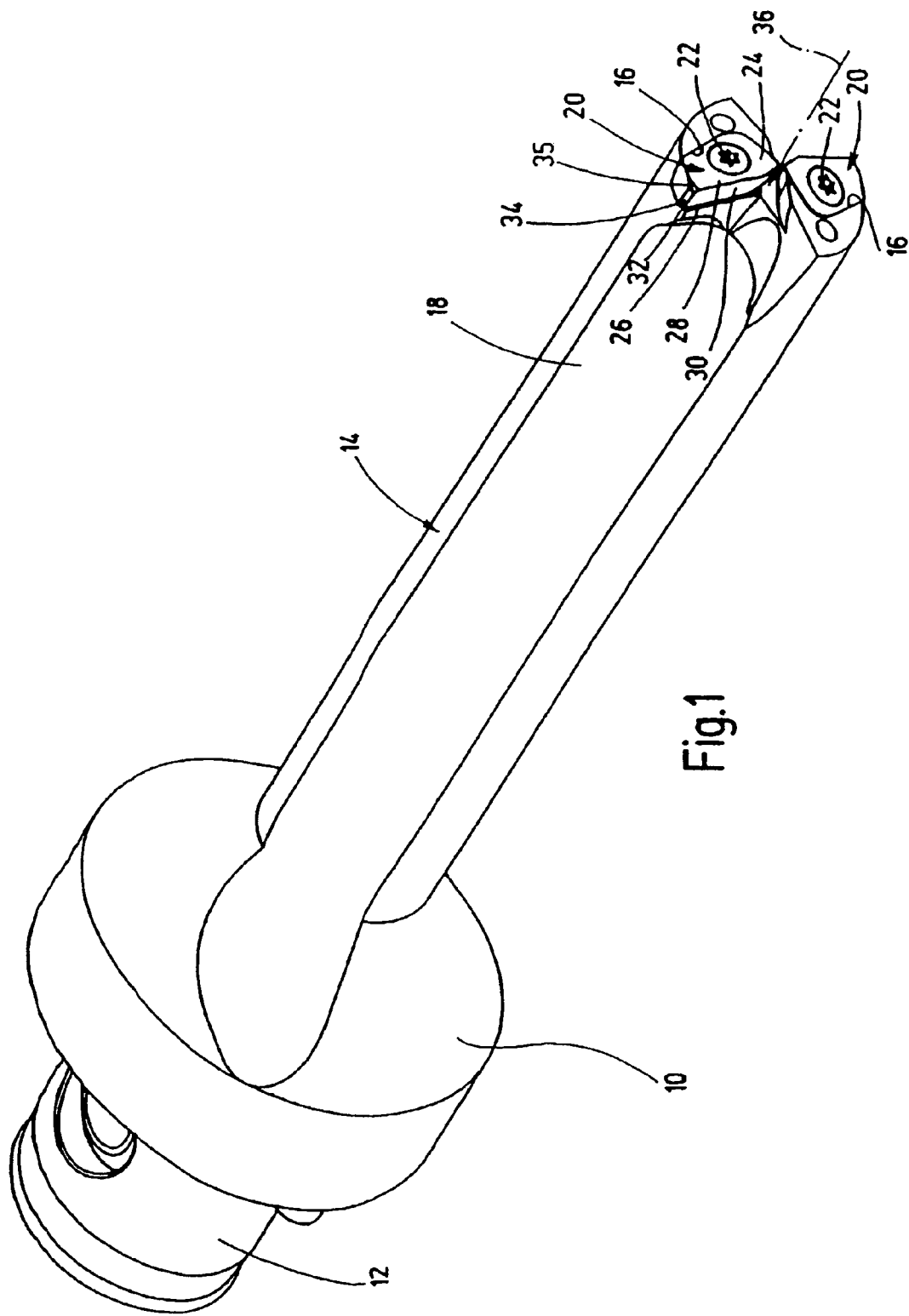
FIG. 1 shows a diagrammatic illustration of a drilling tool with vertical interchangeable inserts.
Figure 2:
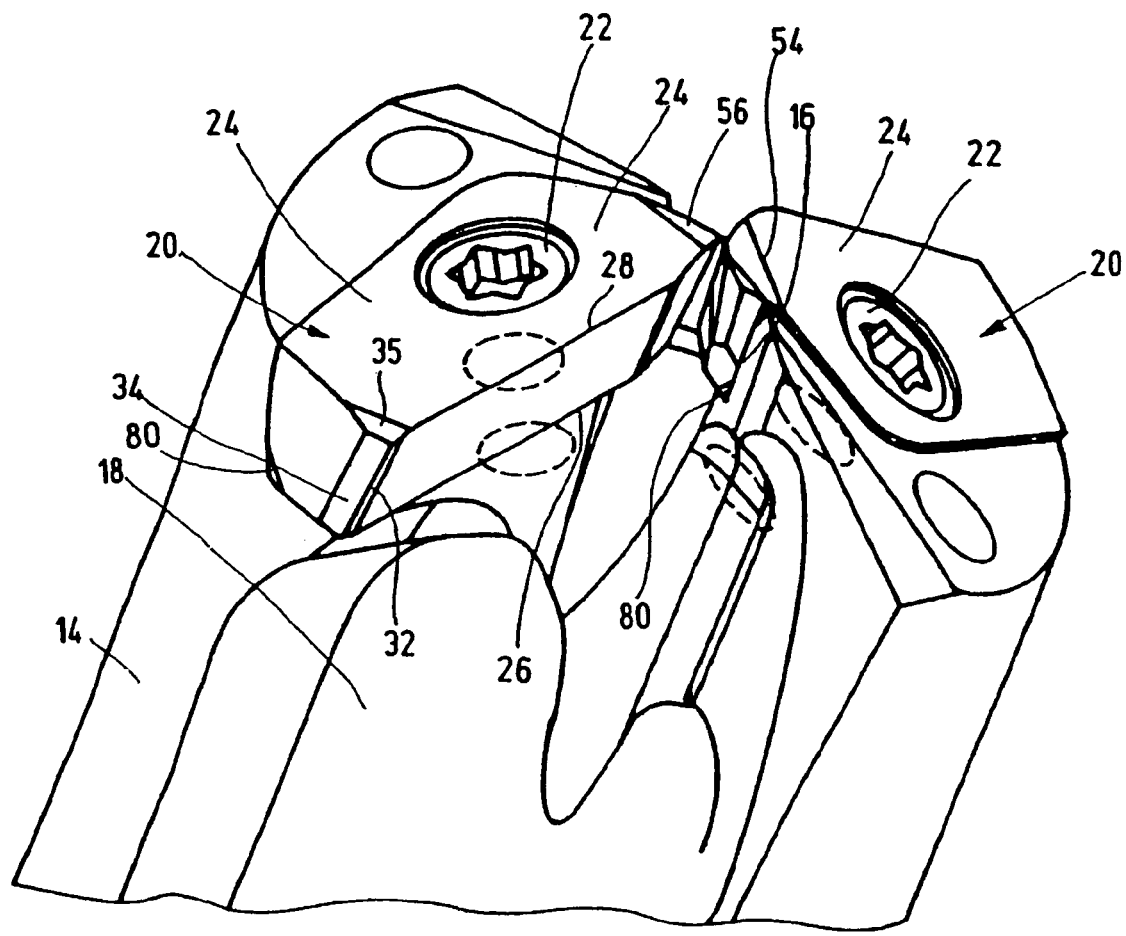
FIG. 2 shows an enlarged detail of FIG. 1.
Figure 3A:
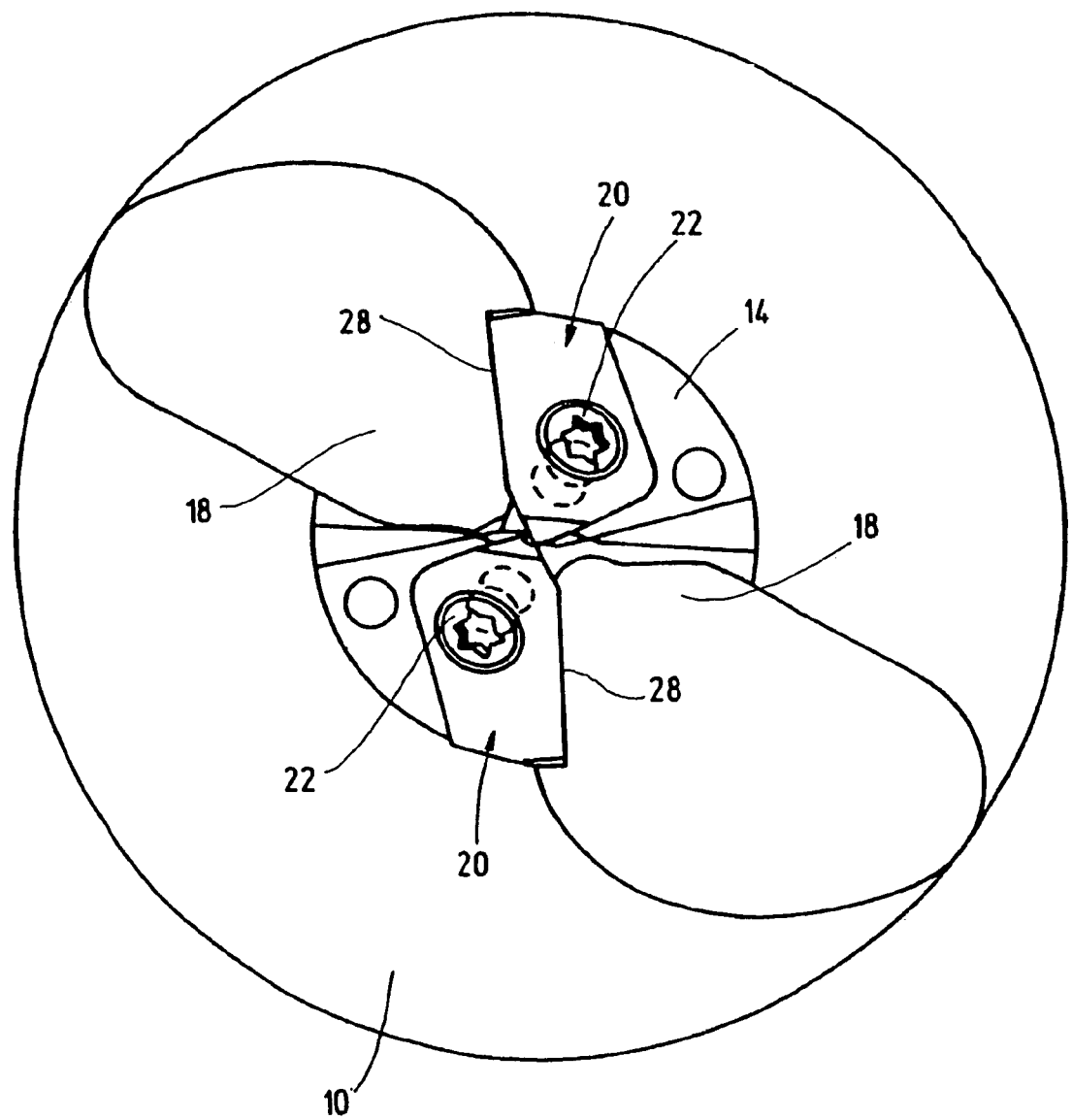
FIG. 3a shows a front end view of the drilling tool according to FIG. 1.
Figure 3B:
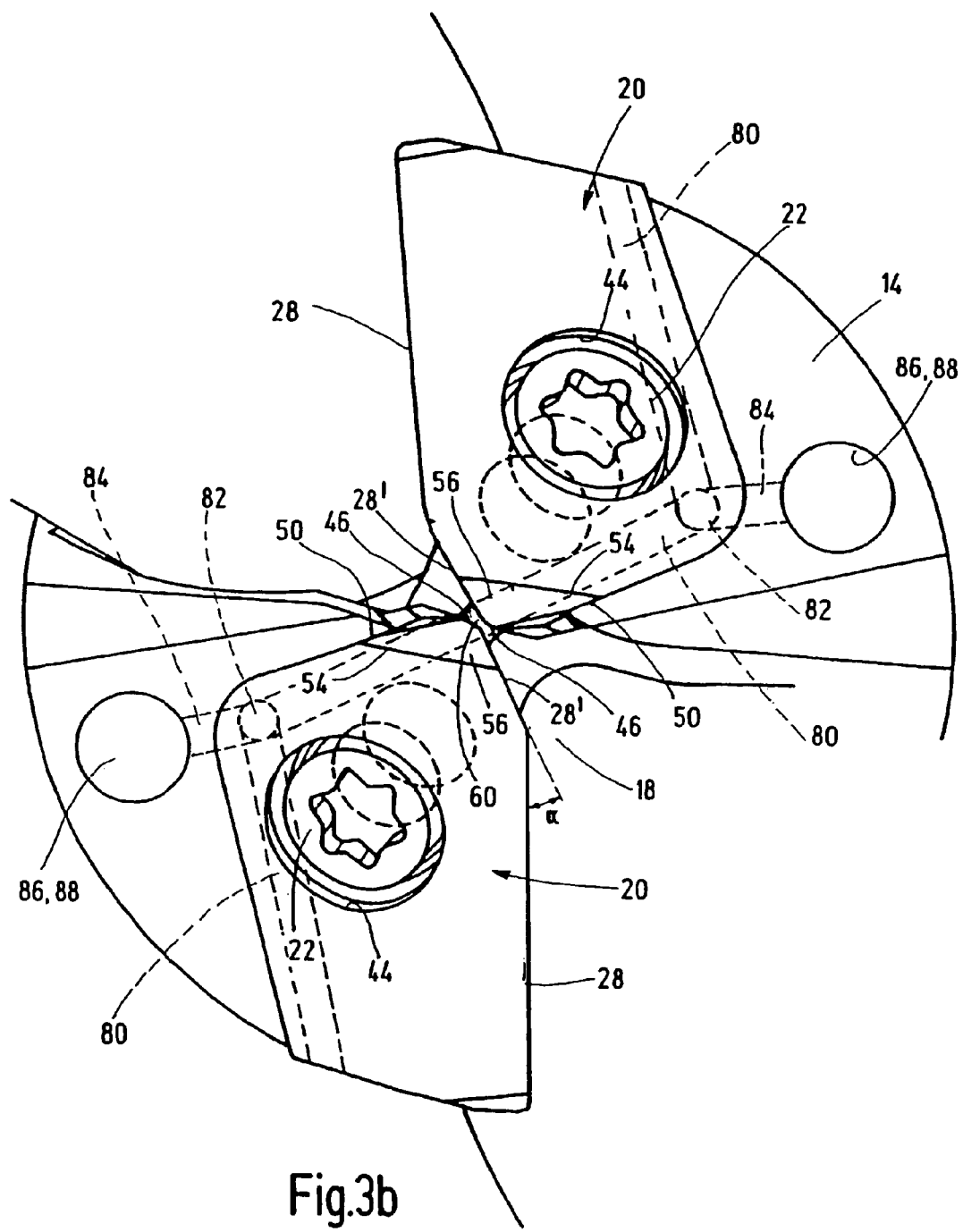
Figure 4B:
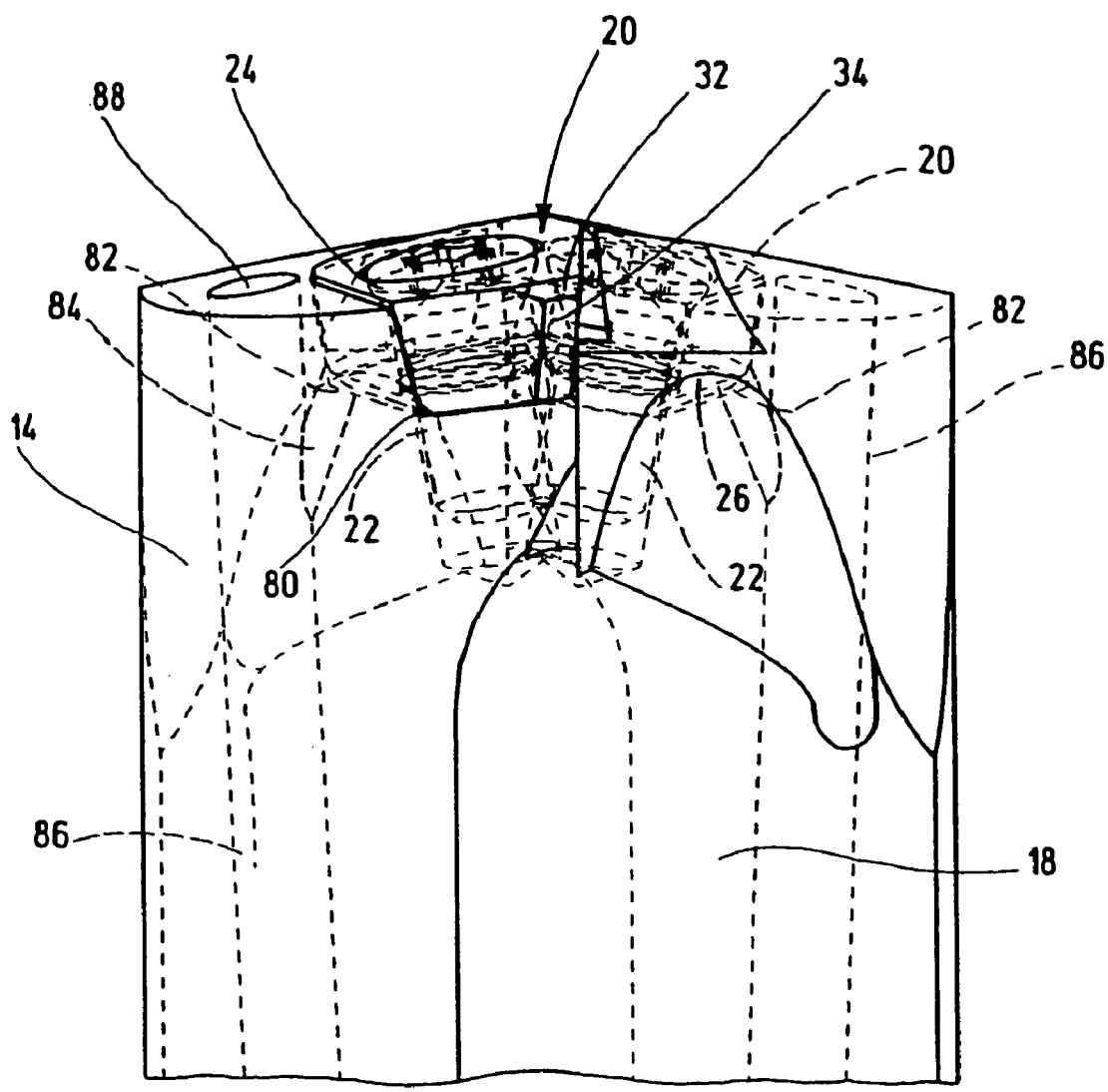

In the fitted state, the interchangeable inserts 20 are at a small distance apart of 0.05 to 0.2 mm in the region of their insert corners 46, with the center gap 60 being formed. In this case, the central cutting-edge parts 28' of the two interchangeable inserts are assigned to one another in such a way that they complement one another to form a chisel edge interrupted by the center gap 60. As can be seen in particular from FIG. 4a, the flanks 24 enclose a positive point angle γ in the feed direction in their radially outer region, this point angle γ ensuring that the drill is centered on the drill hole bottom during the drilling operation. On the other hand, in the region of the deflecting chamfers 56, the central cutting-edge parts 28' of the two inserts are inclined negatively in the feed direction toward the center gap 60 in such a way as to complement one another in a funnel-like manner and form a funnel angle δ. This angle also helps to center the drill on the drill hole bottom and ensures that the pressure forces produced in the center during the chip generation are distributed over a relatively large area and are reduced as a result. It can be seen in FIGS. 5b and c that the bearing surfaces 48, 64 remote from the rake face 30 merge into one another via a rounded insert corner 66 and into the locating surface 26 via locating bevels 68, 69, 70. The locating bevels 68, 69, 70 together with the adjacent seating surfaces of the insert seat 16 form a channel-like clearance space 80, which is open both radially inward toward the center gap 60 and outward toward the outer guide bevel 34 (FIGS. 3b and 4b). Via a respective orifice opening 82 and a branch channel 84, the channel-like clearance space 80 of each insert seat 16 communicates with a cooling channel 86 which is arranged in the basic body and which has a second outlet opening 88 arranged at the end face on the basic body and to which a cooling lubricant can be admitted under pressure in the rear region of the drilling tool. The cooling lubricant passing into the channel-like clearance space 80 via the orifice opening 82 contributes on the outside of the guide bevel 34 to the cooling and lubrication during the drilling operation, whereas on the inside toward the center gap 60 it provides for the removal of the crumbled chips arising there into the chip flutes 18.

In principle, the bearing surface 64, which is essentially oriented radially in the fitted state, may also be of step-shaped design, so that radial interlocking with an insert seat of corresponding step-shaped design at the relevant location is obtained. The fastening screw 22 can thus be relieved of radial forces which occur during the drilling operation.

As can also be seen from FIG. 4a, the basic body, in the region of the center gap 60 between the insert seats, has a concave contour 72 which is axially set back relative to the insert seats and ensures that no inadmissible notch effect occurs on account of the bending forces acting in this region during the drilling operation.

In the exemplary embodiment according to FIGS. 6 to 9, the inserts 20 have a rake face 30 and a locating surface 26 remote from the latter, the rake face 30 and the locating surface 26 being oriented in a plane-parallel manner relative to one another. The rake face 30 leading into the chip flute 18 is defined by the main cutting edge 28 and the adjoining flank 30. Radially on the outside, a secondary cutting edge 32, designed at the same time as a guide edge, and a guide bevel 34 adjoin the main cutting edge 28 and the rake face 30. Following a cutting bevel 35, the secondary cutting edge 32 and the guide bevel 34 extend over the local insert height parallel to the drill axis 36. The guide bevels 34 of the two inserts 20 help to guide the drilling tool in the drill hole, while the point angle between the main cutting edges 28 of the two inserts 20 ensures centering of the drill in the drill hole. The fastening opening 44 for the fastening screws 22 to pass through passes through the interchangeable inserts transversely between rake face 30 and locating surface 26. As can be seen in particular from FIG. 8, the main cutting edges 28 of the interchangeable inserts 20 have a central cutting-edge part 28' which forms a chisel-edge angle α of about 30° and extends up to the central insert corner 46. The flank 24 has a deflecting chamfer 56 which runs from an apex line 54 up to the inner insert corner 46 and is inclined inward. The apex angle β between the radially outer flank part 24 and the deflecting chamfer 56 is about 140° in the exemplary embodiment shown. In this case, the apex line 54 starts from a position within the central cutting-edge part 28' and extends up to the rear insert edge 50. As can be seen from FIG. 2b, the central deflecting chamfer 56 has a polygonal outline defined by the apex line 54, a section of the central cutting-edge part 28' and a section of the insert edge 50. Furthermore, a relieved portion 58 open at the margin toward the basic body 14 is arranged in the region of the central insert corner 46.

In the fitted state, the interchangeable inserts 20 are at a small distance apart of 0.05 to 0.2 mm in the region of their insert corners 46, with the center gap 60 being formed. In this case, the central cutting-edge parts 28' of the two interchangeable inserts are assigned to one another in such a way that they complement one another to form a chisel edge interrupted by the center gap 60. As can be seen in particular from FIG. 9, the flanks 24 enclose a positive point angle in the feed direction in their radially outer region, this point angle ensuring that the drill is centered on the drill hole bottom during the drilling operation. On the other hand, in the region of the deflecting chamfers 56, the central cutting-edge parts 28' of the two inserts are inclined negatively in the feed direction toward the center gap 60 in such a way as to complement one another in a funnel-like manner and form a funnel angle. This angle also helps to center the drill on the drill hole bottom and ensures that the pressure forces produced in the center during the chip generation are distributed over a relatively large area and are reduced as a result.

In the exemplary embodiments shown in FIGS. 10a to d, chip-forming depressions 90 are provided in the region of the rake faces 30 of the interchangeable inserts 20, these chip-forming depressions 30 adjoining the main cutting edge 28 directly or via a bevel 92 and essentially running parallel to them. The four exemplary embodiments differ essentially in the arrangement and design of the chip-forming depression 90 with regard to the main cutting edge 28: in the exemplary embodiment according to FIG. 10a, the chip-forming depression plunges slightly into the outer part of the rake face 30' of the chisel edge 28' and emerges from the rake face 30 at a small distance in front of the secondary cutting edge 32. In the exemplary embodiment according to FIG. 10b, the chip-forming depression 90 passes through the secondary cutting edge 32 and emerges from the rake face 30 in front of the dividing line 94 between the rake face 30 and the inner rake-face part 30'. The exemplary embodiment according to FIG. 10c has an essentially cylindrical chip-forming depression which runs exactly parallel to the main cutting edge 28 outside the chisel edge and passes through both the secondary cutting edge 32 and the dividing line 94 to the inner rake-face part 30'. In the exemplary embodiment shown in FIG. 10d, a chip-forming depression is provided which extends both over the outer part of the rake face 30 and along the central cutting-edge part 28' over the inner rake-face part 30' up close to the central insert corner 46. In the exemplary embodiments in FIGS. 10a to d, the task of the chip-forming depressions 90 is in particular to form the chip during the drilling operation in such a way that it is displaced outward from the drill axis.

A further improvement in this respect can be achieved with the exemplary embodiments shown in figs 11a and b, in which chip breaker notches 96', 96" arranged at a distance from one another are provided in the region of the main cutting edge 28 and pass through the latter. The task of the chip breaker notches 96 is to deform and break the chip produced during the drilling operation in such a way that it can be removed more easily via the chip flutes of the drilling tool.

In the exemplary embodiment according to FIG. 9, which shows an interchangeable insert for horizontal use in the drill body, a chip-forming depression 90 is likewise indicated in the region of the rake face. Furthermore, locating bevels 68 and 70 are provided there, which together with the adjacent seating surfaces of the insert seat form a channel-like clearance space 80 which communicates with a cooling channel 86 in the basic body.

In summary, the following may be emphasized: the invention relates to a double-cutting drilling tool. The drilling tool has a basic body 14 which is rotatable about a drill axis 36 and in which two insert seats 16 are arranged at the end face for accommodating interchangeable inserts 20 of identical design. The interchangeable inserts have a respective rake face 30 and flank 24 which adjoin a main cutting edge 28 while forming a cutting wedge. The main cutting edges 28 of the interchangeable inserts 20 complement one another in the region of a central, angled cutting-edge part 28' to form a chisel edge interrupted by a center gap 60. The aim of the invention is to reduce the risk of fracture in the central region of the interchangeable inserts and to achieve better guidance of the tool. To this end, it is proposed according to the invention that the interchangeable inserts 20 have at their flank an inclined deflecting chamfer 56 running from an apex line 54 up to the central insert corner 46, the flanks 24 being inclined positively in the feed direction in the radially outer region and negatively in the region of their deflecting chamfers 56.

The invention is not restricted to the feature combinations specified in claims 1, 23, 41 and 50. The applicant reserves the right, depending on the examination result, to direct the patent request to one or more of the features or partial features disclosed in the description and in the drawing.

The invention claimed is:

1. A drilling tool having a basic body rotatable about a drill axis, having two insert seats arranged in the point region of the basic body, and having interchangeable inserts which are interchangeably inserted into the insert seats, face one another at a central insert corner over the drill axis while leaving a center gap clear, and have a main cutting edge, extending from a radially outer guide bevel up to the central insert corner, and a respective rake face and flank which meet in the region of the main cutting edge while forming a cutting wedge, the main cutting edges of the interchangeable inserts complementing one another in the region of a central, angled cutting-edge part to form a chisel edge interrupted by the center gap, the interchangeable inserts, at their flank, having an inclined deflecting chamfer running from an apex line, starting from the region of their central cutting-edge part, up to the central insert corner, the flanks being inclined positively in the feed direction in the radially outer region in such a way as to complement one another in an arrow-like manner and negatively in the feed direction toward the center gap in the region of their deflecting chamfers in such a way as to complement one another in a funnel-like manner, the interchangeable inserts having a locating surface remote from the flank and a through-opening, passing through the flank and the locating surface, for a fastening element, and the deflecting chamfer being inclined in the direction of the respective locating surface, wherein the apex line starts from a position within the central cutting-edge part and runs to an opposite insert edge, the central cutting-edge part and the opposite insert edge meeting in the central insert corner, and wherein the basic body, in the region of the center gap between the insert seats, has a concave contour which is axially set back relative to the insert seats.

2. A drilling tool having a basic body rotatable about a drill axis, having two insert seats arranged in the point region of the basic body, and having interchangeable inserts which are interchangeably inserted into the insert seats, face one another at a central insert corner over the drill axis while leaving a center gap clear, and have a main cutting edge, extending from a radially outer guide bevel up to the central insert corner, and a respective rake face and flank which meet in the region of the main cutting edge while forming a cutting wedge, the main cutting edges of the interchangeable inserts complementing one another in the region of a central, angled cutting-edge part to form a chisel edge interrupted by the center gap, the interchangeable inserts, at their flank, having an inclined deflecting chamfer running from an apex line, starting from the region of their central cutting-edge part, up to the central insert corner, the flanks being inclined positively in the feed direction in the radially outer region in such a way as to complement one another in an arrow-like manner and negatively in the feed direction toward the center gap in the region of their deflecting chamfers in such a way as to complement one another in a funnel-like manner, wherein the interchangeable inserts have a locating surface remote from the rake face and a through-opening, passing through the rake face and the locating surface, for a fastening element, the apex line starts from a position within the central cutting-edge part and runs to an insert edge on a bearing-surface side, and the basic body, in the region of the center gap between the insert seats, has a concave contour which is axially set back relative to the insert seats.

3. The drilling tool as claimed in claim 1, wherein the rake-face sections belonging to the central and the radially outer cutting-edge part of the main cutting edge enclose a chisel-edge angle of less than 70° in the transition region.

4. The drilling tool as claimed in claim 3, wherein the chisel-edge angle is 20° to 40°.

5. The drilling tool as claimed in claim 3, wherein the transition region between the two rake-face sections is rounded.

6. The drilling tool as claimed in claim 1, wherein the radially outer flank part and the central deflecting chamfer enclose an apex angle less than 170° with one another in the region of the apex line.

7. The drilling tool as claimed in claim 6, wherein the apex angle is 120° to 160°.

8. The drilling tool as claimed in claim 1, wherein the deflecting chamfer has a triangular outline defined by the apex line, a section of the central cutting-edge part and a section of the adjacent insert edge.

9. The drilling tool as claimed in claim 8, wherein the height of the deflecting chamfer of triangular outline, this height being measured between the apex line and the insert corner, is a multiple of five to twenty times the width of the center gap.

10. The drilling tool as claimed in claim 2, wherein the deflecting chamfer has a polygonal outline defined by the apex line, a section of the central cutting-edge part and a section of the insert edge on the bearing-surface side.

11. The drilling tool as claimed in claim 10, wherein the diameter of the deflecting chamfer of polygonal outline, this diameter being measured between the apex line and the central insert corner, is a multiple of five to twenty times the width of the center gap.

12. The drilling tool as claimed in claim 1, wherein the width of the center gap is less than 0.3 mm.

13. The drilling tool as claimed in claim 1, wherein those sections of the main cutting edges of the two interchangeable inserts which correspond to one another enclose an angle with one another which is not equal to 180°.

14. The drilling tool as claimed in claim 13, wherein the angle enclosed between the main cutting edges varies from 180° between 1° and 4°.

15. The drilling tool as claimed in claim 1, wherein the two inserts are offset axially from one another.

16. The drilling tool as claimed in claim 15, wherein the axial offset is in the order of magnitude of 0.01 mm.

17. An interchangeable insert for double-cutting drilling tools, having a main cutting edge which runs from an outer insert corner up to an inner insert corner, having a respective rake face and flank which adjoin the main cutting edge while forming a cutting wedge, having a locating surface arranged on the insert side remote from the flank, and having a through-opening, passing through the flank and the locating surface, for a fastening element, the flank having a deflecting chamfer which runs from an apex line, arranged in the region between through-opening and inner insert corner, up to the inner insert corner and is inclined in the direction of the locating surface, wherein the apex line starts from a position within a central cutting-edge part and runs to an opposite insert edge, the central cutting-edge part and the opposite insert edge meeting in the inner insert corner, and wherein the locating surface merges via locating bevels into adjacent bearing surfaces remote from the rake face.

18. The drilling tool as claimed in claim 1, wherein one of the insert seat and the interchangeable insert have indentations for engaging one inside the other in a complementary manner, for producing radial interlocking.

19. A drilling tool having a basic body rotatable about a drill axis, having two insert seats arranged in the point region of the basic body, and having interchangeable inserts which are interchangeably inserted into the insert seats, face one another at a central insert corner over the drill axis while leaving a center gap clear, and have a main cutting edge, extending from a radially outer guide bevel up to the central insert corner, and a respective rake face and flank which meet in the region of the main cutting edge while forming a cutting wedge, the main cutting edges of the interchangeable inserts complementing one another in the region of a central, angled cutting-edge part to form a chisel edge interrupted by the center gap, the interchangeable inserts, at their flank, having an inclined deflecting chamfer running from an apex line, starting from the region of their central cutting-edge part, up to the central insert corner, the flanks being inclined positively in the feed direction in the radially outer region in such a way as to complement one another in an arrow-like manner and negatively in the feed direction toward the center gap in the region of their deflecting chamfers in such a way as to complement one another in a funnel-like manner, the interchangeable inserts having a locating surface remote from the flank and a through-opening, passing through the flank and the locating surface, for a fastening element, and the deflecting chamfer being inclined in the direction of the respective locating surface, wherein the apex line starts from a position within the central cutting-edge part and runs to an opposite insert edge, the central cutting-edge part and the opposite insert edge meeting in the central insert corner, and wherein the interchangeable inserts, with their bearing surfaces remote from the rake face and with their locating surface, bear against complementary seating surfaces of the insert seat, in that the bearing surfaces, via a respective locating bevel forming a channel-like clearance space with the adjacent seating surfaces of the insert seat, merge into the locating surface, and wherein a cooling channel which is arranged in the basic body and to which a cooling lubricant can be admitted opens into each insert seat in the region of the channel-like clearance space.

20. A drilling tool having a basic body rotatable about a drill axis, having two insert seats arranged at the end face in the basic body, and having interchangeable inserts which are interchangeably inserted into the insert seats, face one another at a central insert corner over the drill axis while leaving a center gap clear, and have a main cutting edge, extending from a radially outer guide bevel up to the central insert corner, a respective rake face and flank which meet in the region of the main cutting edge while forming a cutting wedge, a locating surface remote from the flank and a through-opening, passing through the flank and the locating surface, for a fastening element, the main cutting edges of the interchangeable inserts complementing one another in the region of a central, angled cutting-edge part to form a chisel edge interrupted by the center gap, wherein the interchangeable inserts, with their bearing surfaces remote from the rake face and with their locating surface, bear against complementary seating surfaces of the insert seat, in that the bearing surfaces, via a respective locating bevel forming a channel-like clearance space with the adjacent seating surfaces of the insert seat, merge into the locating surface, and a cooling channel which is arranged in the basic body and to which a cooling lubricant can be admitted opens into each insert seat in the region of the channel-like clearance space.

21. The drilling tool as claimed in claim 20, wherein the channel-like clearance space is open toward the center gap.

22. The drilling tool as claimed in claim 20, wherein the channel-like clearance space is open toward the radially outer guide bevel.

23. The drilling tool as claimed in claim 20, wherein the bearing surfaces, remote from the rake face, of the interchangeable insert and their locating bevels merge into one another via a rounded insert corner.

24. The drilling tool as claimed in claim 23, wherein the cooling channel opens into the insert seat in the vicinity of the rounded-off insert corner via an orifice opening.

25. The drilling tool as claimed in claim 20, wherein the interchangeable inserts, in the region of their rake faces, have a chip-forming depression adjoining at least part of the main cutting edge.

26. The drilling tool as claimed in claim 25, wherein the chip-forming depression extends at least partly into the region of the central cutting-edge part.

27. The drilling tool as claimed in claim 25, wherein the chip-forming depression extends into the region of the rake face adjoining the deflecting chamfer.

28. The drilling tool as claimed in claim 27, wherein the chip-forming depression extends right into the vicinity of the central insert corner.

29. The drilling tool as claimed in claim 25, wherein the chip-forming depression extends up to the outer secondary cutting edge.

30. The drilling tool as claimed in claim 29, wherein the chip-forming depression passes through the outer secondary cutting edge.

31. The drilling tool as claimed in claim 25, wherein the main cutting edge and the chip-forming depression are separated from one another by a bevel running essentially parallel to the main cutting edge.

32. The drilling tool as claimed in claim 25, wherein the chip-forming depression has a concave base surface.

33. The drilling tool as claimed in claim 25, wherein the chip-forming depression has a partly cylindrical concave base surface.

34. The drilling tool as claimed in claim 20, wherein the main cutting edge is interrupted by chip breaker notches arranged at a distance from one another.

35. The drilling tool as claimed in claim 34, wherein the chip breaker notches are arranged outside the central cutting-edge part.

36. The drilling tool as claimed in claim 34, wherein chip breaker notches are also arranged in the region of the central cutting-edge part.

37. The drilling tool as claimed in claim 20, wherein the secondary cutting edge is oriented so as to run parallel to the drill axis or so as to diverge from the drill axis by an angle of up to 3°.

38. The interchangeable insert as claimed in claim 17, wherein the bearing surfaces remote from the rake face and their locating bevels merge into one another via a rounded insert corner.

39. An interchangeable insert for double-cutting drilling tools, having a main cutting edge which runs from an outer insert corner up to an inner insert corner, having a respective rake face and flank which adjoin the main cutting edge while forming a cutting wedge, having a locating surface arranged on the insert side remote from the flank, and having a through-opening, passing through the flank and the locating surface, for a fastening element, the flank having a deflecting chamfer which runs from an apex line, arranged in the region between through-opening and inner insert corner, up to the inner insert corner and is inclined in the direction of the locating surface, wherein the apex line starts from a position within a central cutting-edge part and runs to an opposite insert edge, the central cutting-edge part and the opposite insert edge meeting in the inner insert corner, and wherein a relieved portion is arranged in the region of the inner insert corner on the side of the locating surface.

40. The interchangeable insert as claimed in claim 39, wherein the deflecting chamfer has a triangular outline defined by the apex line, a section of the central cutting-edge part and a section of the adjacent insert edge.

41. The interchangeable insert as claimed in claim 39, wherein the outer flank part containing the through-opening and the deflecting chamfer enclose an apex angle of less than 170° with one another in the region of the apex line.

42. The interchangeable insert as claimed in claim 41, wherein the apex angle is 120° to 160°.

* * * * *